United States Patent [19]

Takahashi et al.

[11] Patent Number: 4,963,124

[45] Date of Patent: Oct. 16, 1990

[54] PLANETARY GEAR TRANSMISSION FOR MOTOR VEHICLE

[75] Inventors: Tokuyuki Takahashi, Aichi; Seitoku Kubo, Toyota; Hiroshi Itoh, Toyota; Masayuki Fukai, Toyota, all of Japan

[73] Assignee: Toyota Jidosha Kabushiski Kaisha, Toyota, Japan

[21] Appl. No.: 418,259

[22] Filed: Oct. 6, 1989

[30] Foreign Application Priority Data

Oct. 26, 1988 [JP] Japan .................. 63-270150
Feb. 4, 1989 [JP] Japan .................. 1-26473

[51] Int. Cl.$^5$ .............................................. F16H 57/10
[52] U.S. Cl. ..................... 475/278; 475/276; 475/277
[58] Field of Search ............... 475/54, 56, 271, 275, 475/276, 277, 278, 280, 288, 286

[56] References Cited

U.S. PATENT DOCUMENTS

| | | | |
|---|---|---|---|
| 4,046,031 | 9/1977 | Ott et al. | 475/286 X |
| 4,205,563 | 6/1980 | Gorrell | 475/276 X |
| 4,395,925 | 8/1983 | Gaus | 475/278 |
| 4,660,439 | 4/1987 | Hiraiwa | 475/278 X |

FOREIGN PATENT DOCUMENTS

| | | | |
|---|---|---|---|
| 2447581 | 4/1976 | Fed. Rep. of Germany | 475/280 |
| 50-90853 | 7/1975 | Japan . | |
| 59-113346 | 6/1984 | Japan | 475/276 |
| 59-117943 | 7/1984 | Japan | 475/276 |
| 59-222644 | 12/1984 | Japan | 475/276 |
| 61-45139 | 3/1986 | Japan | 475/275 |
| 61-70252 | 4/1986 | Japan . | |

Primary Examiner—Dwight Diehl
Assistant Examiner—Benjamin Levi
Attorney, Agent, or Firm—Oblon, Spivak, McClelland, Maier & Neustadt

[57] ABSTRACT

A vehicle transmission including a first, a second and a third planetary gear unit coaxially disposed between an input and an output member. The three units have respective first, second and third sun gears, respective first, second and third planetary gears, respective first, second and third carriers, and respective first, second and third ring gears. The first carrier, second ring gear, third sun gear and output members are connected to each other, while the second carrier and the third ring gear are connected to each other. The transmission has a first and a second coupling device for connecting the first ring and sun gears to the input member, respectively, a third and a fourth coupling device for connecting the first sun gear to the second sun gear and to the second carrier and third ring gear, respectively, a fifth coupling device for fixing the third carrier to a stationary member, a sixth coupling device, for fixing the second carrier and third ring gear to the stationary member, and a seventh coupling device for fixing the second sun gear to the stationary member.

11 Claims, 5 Drawing Sheets

FIG. 2

| | C1 | C2 | C3 | C4 | B1 | B2 | B3 | SPEED REDUCTION RATIO WHERE $\rho_1=0.3$, $\rho_2=0.341$, $\rho_3=0.695$ | |
|---|---|---|---|---|---|---|---|---|---|
| 1ST-SPEED | ○ | | ○ | | ○ | | | $\{\rho_2+\rho_1(1+\rho_2)(1+\rho_3)\}/\rho_2$ | 3.0 |
| 2ND-SPEED | ○ | | ○ | | | ○ | | $\{\rho_2+\rho_1(\rho_2+1)\}/\rho_2$ | 2.180 |
| 3RD-SPEED | ○ | | ○ | | | | ○ | $1+\rho_1$ | 1.3 |
| 4TH-SPEED | ○ | ○ | ○ | | | | ○ | 1 | 1.0 |
| 5TH-SPEED | | ○ | | ○ | | | | $1/(1+\rho_2)$ | 0.746 |
| REAR | | ○ | ○ | | | ○ | | $1/\rho_2$ | 2.93 |

|  | C1 | C2 | C3 | C4 | B1 | B2 | B3 | B4 | F1 | F2 | F3 |
|---|---|---|---|---|---|---|---|---|---|---|---|
| 1ST-SPEED | ○ |  | ◎ |  | ◎ |  |  |  | ○ | ○ |  |
| 2ND-SPEED | ○ |  | ◎ |  |  | ◎ |  | ○ | ○ |  | ○ |
| 3RD-SPEED | ○ |  |  | ○ |  | ◎ |  | ○ |  |  | ○ |
| 4TH-SPEED | ○ | ○ |  | ○ |  |  |  | (○) | ○ |  |  |
| 5TH-SPEED |  | ○ |  | ○ |  |  | ○ | (○) |  |  |  |
| REAR |  | ○ | ○ |  | ○ |  |  |  |  |  |  |

|  | C1 | C2 | C3 | C4 | B1 | B2 | B3 | B4 | B5 | F1 | F2 | F3 |
|---|---|---|---|---|---|---|---|---|---|---|---|---|
| 1ST-SPEED | ○ |  | ◎ |  | ◎ |  |  |  | ○ | ○ | ○ |  |
| 2ND-SPEED | ○ |  | ◎ |  |  | ◎ |  | ○ | (○) | ○ |  | ○ |
| 3RD-SPEED | ○ |  |  | ○ |  | ◎ |  | ○ | (○) |  |  | ○ |
| 4TH-SPEED | ○ | ○ |  | ○ |  |  |  | (○) | (○) | ○ |  |  |
| 5TH-SPEED |  | ○ |  | ○ |  |  | ○ | (○) | (○) |  |  |  |
| REAR |  | ○ | ○ |  | ○ |  |  |  |  |  |  |  |

|  | C1 | C2 | C3 | C4 | B2 | B3 | B4 | B5 | F1 | F2 | F3 |
|---|---|---|---|---|---|---|---|---|---|---|---|
| 1ST-SPEED | ○ |  |  |  |  |  | ○ | ○ | ○ |  |  |
| 2ND-SPEED | ○ |  | ◎ |  | ◎ |  | ○ | (○) | ○ |  | ○ |
| 3RD-SPEED | ○ |  |  | ○ | ◎ |  | ○ | (○) |  |  | ○ |
| 4TH-SPEED | ○ | ○ |  | ○ |  |  | (○) | (○) | ○ |  |  |
| 5TH-SPEED |  | ○ |  | ○ |  | ○ | (○) | (○) |  |  |  |
| REAR |  | ○ | ○ |  | ○ |  |  |  |  |  |  |

PLANETARY GEAR TRANSMISSION FOR MOTOR VEHICLE

BACKGROUND OF THE INVENTION

1. Field of the Invention

The present invention relates to improvements in a planetary gear transmission disposed between an engine or motor and a drive wheel or wheels of a motor vehicle such as an automobile and a railway carriage.

2. Discussion of the Prior Art

Planetary gear type transmissions which have a plurality of automatically selected gear or speed positions are widely used for motor vehicles. Such planetary gear transmissions are required to be simple in construction and small-sized, provide a wide range of speed reduction ratio, and permit easy control of the shifting operations.

A typical example of the planetary gear transmission is disclosed in laid-open Publication No. 50-90853 of unexamined Japanese Patent Application. This transmission includes a first, a second and a third single-pinion planetary gear unit which are disposed in series, so as to provide five forward drive speed positions. The first planetary gear unit has a first sun gear, a first planetary gear, a first carrier and a first ring gear, and the second planetary gear unit has a second sun gear, a second planetary gear, a second carrier and a second ring gear. Similarly, the third planetary gear unit has a third sun gear, a third planetary gear, a third carrier and a third ring gear. The planetary gear transmission provides a comparatively wide range of speed reduction ratio, and all the forward drive speed positions can be established without requiring substantially concurrent disengagement of a clutch or brake and engagement of another clutch or brake. Usually, the concurrent disengagement and engagement of two or more clutches and/or brakes are difficult to control, and a vehicle engine to which the transmission is connected tends to race or the planetary gears of the transmission tend to be locked, upon shifting of the transmission from one position to another. Therefore, the elimination of the concurrent disengagement and engagement of the coupling devices results in easy control of the shifting operations of the transmission.

However, the conventional planetary gear transmission as described above suffers from a problem which arises from the arrangement in which the input torque received by the input member is first imparted to the second sun gear of the second planetary gear unit when the transmission is shifted to the first-speed position having the highest speed reduction ratio. The input torque is maximum in the first-speed position and the sun gear of each planetary gear unit has the smallest diameter. However, the second sun gear to which the input torque is imparted in the first-speed position should have sufficient strength for sufficient durability. Accordingly, the second sun gear should have a relatively large diameter and/or the teeth should have a relatively large width. Therefore, the transmission tends to be comparatively large-sized and massive, contrary to the recent requirement for compact and small-sized construction of the transmission.

SUMMARY OF THE INVENTION

It is therefore an object of the present invention to provide a compact and small-sized planetary gear transmission for a motor vehicle, which has three single-pinion planetary gear units capable of providing a wide range of speed reduction ratio and which permits easy control of the shifting operations.

The above object may be achieved according to the principle of the present invention, which provides a planetary gear transmission for a motor vehicle, including an input member, an output member, a stationary member, a first single-pinion type planetary gear unit having a first sun gear, a first planetary gear, a first carrier rotatably supporting the first planetary gear, and a first ring gear, a second single-pinion type planetary gear unit having a second sun gear, a second planetary gear, a second carrier rotatably supporting the second planetary gear, and a second ring gear, and a third single-pinion type planetary gear unit having a third sun gear, a third planetary gear, a third carrier rotatably supporting the third planetary gear, and a third ring gear, the first, second and third planetary gear units being disposed coaxially with each other in the order of description, for transmitting power from the input member to the output member, at a selected one of different speed reduction ratios, the planetary gear transmission being characterized in that the first carrier, the second ring gear, the third sun gear and the output member are connected to each other, while the second carrier and the third ring gear are connected to each other, and in that the transmission comprises a first, a second, a third, a fourth, a fifth, a sixth and a seventh coupling device. The first coupling device is adapted to connect the first ring gear to the input member. The second coupling device is adapted to connect the first sun gear to the input member. The third coupling device is adapted to connect the first sun gear to the second sun gear. The fourth coupling device is adapted to connect the first sun gear to the second carrier and the third ring gear. The fifth coupling device is adapted to fix the third carrier to the stationary member. The sixth coupling device is adapted to fix the second carrier and the third ring gear to the stationary member. The seventh coupling device is adapted to fix the second sun gear to the stationary member.

Each of the first through seventh coupling devices may be a hydraulically operated multiple-disk type clutch, or a hydraulically operated brake having a single brake band or two brake bands wound in the opposite directions, which are used in a conventional automatic transmission for a motor vehicle. Some of the coupling devices may be a combination of a clutch and a one-way clutch, or a combination of a brake or brakes and a one-way clutch.

The planetary gear transmission of the present invention constructed as described above may be adapted such that the input torque may be received by the first ring gear, rather than by the second sun gear, when the 1st-speed position is established, i.e., when the input torque is the largest. Since the first ring gear has a diameter considerably larger than the sun gear, the first ring gear has strength sufficient to withstand the maximum input torque. Hence, the second sun gear of the present transmission may be considerably smaller in diameter or width than the counterpart of the conventional transmission, whereby the present transmission may be comparatively small-sized and compact. Further, the present planetary gear transmission may have five forward drive speed positions which provide a wide range of speed reduction ratio, and which may be established without substantial concurrent disengagement of one coupling device and engagement of another coupling device. Thus, the shifting operations of the instant transmission may be easily controlled, without otherwise possible racing of an engine of the vehicle to which the transmission is connected, or without locking of the planetary gear units.

As indicated above, the present transmission may have one rear drive position, and five forward drive speed positions, i.e., a 1st-speed position having a highest speed reduction ratio, a 2nd-speed position having a speed reduction ratio lower than that of the 1st-speed position, a 3rd-speed position having a speed reduction ratio lower than that of the 2nd-speed position, a 4th-speed position having a speed reduction ratio (which may be 1.0) lower than that of the 3rd-speed position, and a 5th-speed position lower than that of the 4th-speed position. In this case, the operating positions of the present transmission may be established in the following manner, for example. That is, the 1st-speed position may be established by engagement of the first, third and fifth coupling devices, so as to effect concurrent connections between the first ring gear and the input member, between the first and second sun gears, and between the third carrier and the stationary member. The 2nd-speed position may be established by engagement of the first, third and sixth coupling devices, so as to effect concurrent connections between the first ring gear and the input member, between the first and second sun gears, and between the second carrier and third ring gear, and the stationary member. The 3rd-speed position may be established by engagement of the first, third and seventh coupling devices, so as to effect concurrent connections between the first ring gear and the input member, between the first and second sun gears, and between the second sun gear and the stationary member. The 4th-speed position may be established by engagement of the first, second and third coupling devices, so as to effect concurrent connections between the first ring gear and the input member, between the first sun gear and the input member, and between the first and second sun gears. The 5th-speed position may be established by engagement of the second, fourth and seventh coupling devices, so as to effect concurrent connections between the first sun gear and the input member, between the first sun gear and the second carrier, and between the second sun gear and the stationary member. The rear drive position may be established by engagement of the second, third and sixth coupling devices, so as to effect concurrent connections between the first sun gear and the input member, between the first and second sun gears, and between the second carrier and third ring gear, and the stationary member.

The 3rd-speed position may also be established by engagement of the first, fourth and sixth coupling devices, so as to effect concurrent connections between the first ring gear and the input member, between the first sun gear, and the second carrier and third ring gear, and between the second carrier and third ring gear, and the stationary member. In this case, it is desirable, for easy shifting of the transmission, that the 4th-speed position be established by engagement of the first, second and fourth coupling devices, so as to effect concurrent connections between the first ring gear and the input member, between the first sun gear and the input member, and between the first sun gear, and the second carrier and third ring gear. However, the engagement of the first and second coupling devices so as to effect concurrent connections between the first ring gear and the input member and between the first sun gear and the input member is essential to the establishment of the 4th-speed position.

The rear drive position may also be established by engagement of the second, third and fifth coupling devices, so as to effect concurrent connections between the first sun gear and the input member, between the first and second sun gears, and between the third carrier and the stationary member.

BRIEF DESCRIPTION OF THE DRAWINGS

The above and optional objects, features and advantages of the present invention will be more apparent by reading the following detailed description of presently preferred embodiments of the invention, when considered in connection with the accompanying drawings, in which:

FIG. 2 is a view showing operating positions of frictional coupling devices of the transmission of FIG. 1 in relation to different operating positions of the transmission;

DETAILED DESCRIPTION OF THE PREFERRED EMBODIMENTS

Figure 1:
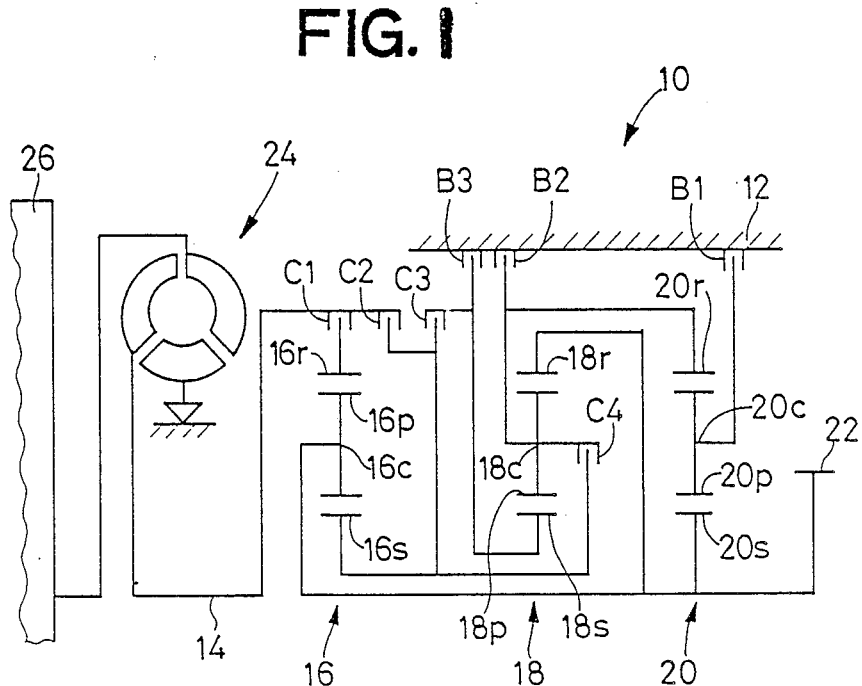
FIG. 1 is a schematic view illustrating a part of a vehicle power transmitting system which includes one embodiment of a planetary gear transmission of the present invention.

Referring first to FIG. 1, reference numeral 10 generally denotes a planetary gear type transmission for a motor vehicle (hereinafter referred to as "planetary gear transmission" or simply as "transmission", where appropriate). The planetary gear transmission 10 has an input shaft 14, a first planetary gear unit 16, a second planetary gear unit 18, a third planetary gear unit 20, and an output gear 22. These elements 14, 16, 18, 20, 22 are all disposed in the order of description, within a transmission casing 12 attached to the body of the vehicle, such that all the elements are aligned with a common axis, i.e., axis of rotation of the transmission 10.

The input shaft 14 is connected to an engine 26 of the vehicle via a torque converter 24 disposed therebetween, while the output gear 22 is connected to drive wheels of the vehicle via a differential gear device as well known in the art. It will be understood that the input shaft 14 and the output gear 22 function as an input and an output member of the transmission 10, while the transmission casing 12 serves as a stationary member secured to the vehicle body. Since each of the transmission 10 and the torque converter 24 is constructed symmetrically with respect to their axes of rotation, only the upper halves of the transmission and torque converter are shown in FIG. 1, in the interest of brevity and simplification.

Each of the coaxially disposed first, second and third planetary gear units 16, 18 and 20 is a well known single-pinion type planetary gear assembly. The first planetary gear unit 16 includes a first sun gear 16s, a first planetary gear 16p, a first carrier 16c and a first ring gear 16r. The first planetary gear 16p rotatably supported by the first carrier 16c is disposed between and meshes with the first sun gear 16s and the first ring gear 16r. The second planetary gear unit 18 includes a second sun gear 18s, a second planetary gear 18p, a second carrier 18c, and a second ring gear 18r. The second planetary gear 18p rotatably supported by the second carrier 18c is disposed between and meshes with the second sun and ring gears 18s, 18r. The third planetary gear unit 20 includes a third sun gear 20s, a third planetary gear 20p, a third carrier 20c, and a third ring gear 20r. The third planetary gear 20p rotatably supported by the third carrier 20c is disposed between and meshes with the third sun and ring gears 20s, 20r.

In the planetary gear transmission 10, the first carrier 16c, second ring gear 18r, third sun gear 20s and output gear 22 are connected to each other so that these members are rotated as a unit. Further, the second carrier 18c and the third ring gear 20r are connected to each other as a unit.

Transmission 10 further incorporates: a first clutch C1 for connecting the first ring gear 16r and the input shaft 14, when needed; a second clutch C2 for connecting the first sun gear 16s and the input shaft 14, when needed; a third clutch C3 for connecting the first sun gear 16s and the second sun gear 18s, when needed; a fourth clutch C4 for connecting the first sun gear 16s to the second carrier 18c and the third ring gear 20r, when needed; a first brake B1 for fixing the third carrier 20c to the stationary transmission casing 12, when needed; a second brake B2 for fixing the second carrier 18c and the third ring gear 20r to the transmission casing 12, when needed; and a third brake B3 for fixing the second sun gear 18s to the transmission casing 12, when needed.

Each of the first, second, third and fourth clutches C1, C2, C3 and C4, and the first, second and third brakes B1, B2 and B3 may be a hydraulically operated one that is used in a conventional automatic transmission for a motor vehicle. The clutches C1, C2, C3, C4 may be multiple-disk type clutches, and the brake B1, B2, B3 may use a single brake band, or two brake bands wound in the opposite directions.

Suitable connecting means is provided as required, between the first brake B1 and the third carrier 20c, between the second brake B2, and the second carrier 18c and third ring gear 20r, and between the third brake B3 and second sun gear 18s. Similarly, suitable connecting means is provided as required, between the first clutch C1, and the input shaft 14 and first ring gear 16r, between the second clutch C2, and the input shaft 14 and first sun gear 16s, between the third clutch C3, and first and second sun gears 16s, 18s, between the fourth clutch C4, and the first sun gear 16s and second carrier 18c, between the elements of each planetary gear unit 16, 18, 20, and between the output gear 22, and the first carrier 16c, second ring gear 18r and third sun gear 20s.

The first, second, third and fourth clutches C1, C2, C3 and C4 correspond to a first, a second, a third and a fourth frictional coupling device, respectively, while the first, second and third brakes B1, B2 and B3 correspond to a fifth, a sixth and a seventh frictional coupling device, respectively.

As indicated in the table of FIG. 2, the present planetary gear transmission 10 constructed as described above has six operating positions, i.e., five forward-drive positions (1st-speed, 2nd-speed, 3rd-speed, 4th-speed and 5th-speed positions) and one rear drive position. Each of these six operating positions is established by simultaneous activation or engagement of the appropriate three frictional coupling devices selected from the seven devices C1–C4 and B1–B3. In the present embodiment, the first, second and third planetary gear units 16, 18 and 20 have respective gear ratios $\rho_1 = 0.3$, $\rho_2 = 0.341$ and $\rho_3 = 0.695$, respectively. The table of FIG. 2 indicates the gear ratios or speed reduction ratios (rotating speed of the input shaft 14/rotating speed of the output gear 22) of the six operating positions of the transmission 10.

The gear ratios $\rho_2$, $\rho_2$ and $\rho_3$ indicated above are determined as follows:

$\rho_1 = Z_{1s}/Z_{1r}$
$\rho_2 = Z_{2s}/Z_{2r}$
$\rho_3 = Z_{3s}/Z_{3r}$ where, $Z_{1s}$: Number of teeth of the first sun gear 16s
$Z_{1r}$: Number of teeth of the first ring gear 16r
$Z_{2s}$: Number of teeth of the second sun gear 18s
$Z_{2r}$: Number of teeth of the second ring gear 18r
$Z_{3s}$: Number of teeth of the third sun gear 20s
$Z_{3r}$: Number of teeth of the third ring gear 20r There will be described each of the six operating positions of the planetary gear transmission 10.

The 1st-speed position of the transmission 10 is established or selected by concurrent engagement of the first clutch C1, third clutch C3 and first brake B1, which result in concurrent connections between the first ring gear 16r and the input shaft 14, between the first and second sun gears 16s and 18s, and between the third carrier 16c and the transmission casing 12. In the 1st-speed position, power received by the input shaft 14 is first imparted to the first ring gear 16r, and then transmitted to the first carrier and sun gear 16c, 16s through the first planetary gear 16p. The power imparted to the first sun gear 16s is transmitted to the second carrier and ring gear 18c, 18r through the third clutch C3, second sun gear 18s and second planetary gear 18p, and transmitted further to the third sun gear 20s through the third ring and planetary gears 20r, 20p. Since the third carrier 20c is stationary in this condition, the first and second sun gears 16s, 18s, the second carrier 18c and the third ring gear 20r are rotated in the direction opposite to the direction of rotation of the input shaft 14. As a result, the first carrier 16c, the second ring gear 18r and the third sun gear 20s are rotated in the same direction as the input shaft 14, whereby the output gear 22 is rotated in the same direction as the input shaft 14, namely, in the forward direction, at the speed reduction ratio of $\{(\rho_2 + \rho_1(1+\rho_2))(1+\rho_3)\}/\rho_2$.

The 2nd-speed position of the transmission 10 is established by concurrent engagement of the first and third clutches C1, C3 and the second brake B2, which result in concurrent connections between the first ring gear 16r and the input shaft 24, between the first and second sun gears 16s, 18s, and between the second carrier 18c, and the third ring gear 20r and transmission casing 12. In the 2nd-speed position, the power received by the input shaft 14 is first imparted to the first ring gear 16r and then transmitted to the first carrier and sun gear 16c, 16s via the first planetary gear 16p. The power imparted to the first sun gear 16s is transmitted to the second ring gear 18r, through the third clutch C3 and the second planetary and ring gears 18p, 18r. Since the second carrier 18c is stationary in this condition, the first and second sun gears 16s, 18s are rotated in the direction opposite to the direction of rotation of the input shaft 14. Consequently, the first carrier 16c and the second ring gear 18r are rotated in the same direction as the input shaft 14, namely, in the forward direction, at the speed reduction ratio of $\{\rho_2+\rho_1(\rho_2+1)\}/\rho_2$.

The 3rd-speed position of the transmission 10 is established by concurrent engagement of the first and third clutches C1, C3 and the third brake B3, which result in concurrent connections between the first ring gear 16r and the input shaft 24, between the first and second sun gears 16s, 18s, and between the second sun gear 18s and the transmission casing 12. In the 3rd-speed position, the power received by the input shaft 14 is first imparted to the first ring gear 16r and then transmitted to the first carrier 16c via the first planetary gear 16p, whereby the output gear 22 is rotated in the same direction as the input shaft 14, namely, in the forward direction, at the speed reduction ratio of $(1+\rho_1)$.

The 4th-speed position is established by engaging actions of the first, second and third clutches C1, C2 and C3, which result in concurrent connections between the first ring gear 16r and the input shaft 14, between the first sun gear 16s and the input shaft 14, and between the first and second sun gears 16s, 18s. In this 4th-speed position, the elements of the first, second and third planetary gear units 16, 18 and 20 are rotated as a unit, whereby the power received by the input shaft 14 is imparted to the output gear 22. Thus, the output gear 22 is rotated with the input shaft 14 in the forward direction, at the speed reduction ratio of 1.0.

The 5th-speed position is established by concurrent engagement of the second and fourth clutches C2, C4 and the third brake B3, which result in concurrent connections between the first sun gear 16s and the input shaft 14, between the first sun gear 16s, and the second carrier 18c and third ring gear 20r, and between the second sun gear 18s and the transmission casing 12. In this 5th-speed position, the power received by the input shaft 14 is imparted to the second ring gear 18r via the fourth clutch C4 and the second carrier and planetary gears 18c, 18p. As a result, the second carrier and ring gears 18c, 18r are rotated in the same direction as the input shaft 14, namely, in the forward direction, at the speed reduction ratio of $1/(1+\rho_2)$. That is, the speed of the output gear 22 is higher than that of the input shaft 14.

The rear drive position of the transmission 10 is established by concurrent engagement of the second and third clutches C2, C3 and the second brake B2, which result in concurrent connections between the first sun gear 16s and the input shaft 14, between the first and second sun gears 16s 18s, and between the second carrier 18c and third ring gear 20r, and the transmission casing 12. In this rear drive position, the power received by the input shaft 14 is imparted to the second ring gear 18r via the second sun and planetary gears 18s, 18p. Since the second carrier 18c is stationary in this condition, the second ring gear 18r is rotated in the direction opposite to the direction of rotation of the input shaft 14. Consequently, the output gear 22 is rotated in the reverse direction opposite to the forward direction of rotation of the input shaft 14, at the speed reduction ratio of $1/\rho_2$.

The 3rd-speed position may be established by concurrent engagement of the first and fourth clutches C1, C4 and the second brake B2, rather than the third clutch C3 and the third brake B3 as indicated in FIG. 2. In this case, however, it is desirable that the first, second and fourth clutches C1, C2 and C4 be activated for engagement, for easy control of the shifting or engaging operations of the transmission 10.

In the present embodiment of the planetary gear transmission 10 of the present invention, the input torque transmitted from the torque converter 24 to the input shaft 14 is first received by the first ring gear 16r when the input torque is the largest or relatively large, namely, while the transmission is shifted to the 1st-speed position (largest input torque) or to the 2nd-speed or 3rd-speed position (relatively large input torque). The ring gear 16r which receives the torque from the input shaft 14 in the above-indicated condition has a larger diameter and more rigidity or strength than a sun gear of a conventional planetary gear transmission wherein the sun gear first receives the torque from the input shaft when the largest torque is received or when the conventional transmission is shifted to the 1st-speed position. Accordingly, the present planetary gear transmission can be small-sized as compared with the conventional planetary gear transmission whose sun gear indicated above should have a relatively large diameter.

The present planetary gear transmission 10 permits a change in the speed reduction ratio over a comparatively wide range, by selective simultaneous activation of the three frictional coupling devices by the hydraulic actuators. Further, any shifting operation of the transmission 10 from one of the five forward drive positions to another does not require substantially concurrent disengagement of one of the clutches C1-C4 and engagement of another clutch, according to the engagement and disengagement table of FIG. 2. For example, the shifting from the 3rd-speed position to the 4th-speed position requires only an engaging action of the second clutch, and the shifting from the 5th-speed position to the 4th-speed position requires only disengaging actions of the first and third clutches.

The present transmission 10 has improved durability or life expectancy, because of relatively low rotating speeds of the rotary members of the planetary gear units 16, 18, 20 in any one of the operating positions of the transmission. For instance, where the speed of the input shaft 14 is represented by "1" and the gear ratios $\rho_1$, $\rho_2$ and $\rho_3$ are 0.400, 0.374 and 0.700, respectively, the speeds of the rotary members of the planetary gear units 16, 18, 20 are as indicated in Table 1. Where the speed reduction ratios $\rho_1$, $\rho_2$ and $\rho_3$ are 0.300, 0.341 and 0.695, respectively, the speeds of the rotary members are as indicated in Table 2. Where the speed reduction ratios $\rho_1$, $\rho_2$ and $\rho_3$ are 0.300. 0.395 and 0.698, respectively, the speeds of the rotary members are as indicated in Table 3.

TABLE 1

|     | 1st-Speed | 2nd-Speed | 3rd-Speed | 4th-Speed | 5th-Speed | Rear Drive |
|-----|-----------|-----------|-----------|-----------|-----------|------------|
| 16s | −1.500    | −1.083    | 0.000     | 1.000     | 1.000     | 1.000      |
| 16c | 0.286     | 0.405     | 0.714     | 1.000     | 1.374     | −0.374     |

TABLE 1-continued

|     | 1st-Speed | 2nd-Speed | 3rd-Speed | 4th-Speed | 5th-Speed | Rear Drive |
|-----|-----------|-----------|-----------|-----------|-----------|------------|
| 16r | 1.000     | 1.000     | 1.000     | 1.000     | 1.524     | −0.923     |
| 16p | 2.381     | 1.984     | 0.952     | 0.000     | 0.499     | −1.832     |
| 18s | −1.500    | −1.083    | 0.000     | 1.000     | 0.000     | 1.000      |
| 18c | −0.200    | 0.000     | 0.520     | 1.000     | 1.000     | 0.000      |
| 18r | 0.286     | 0.405     | 0.714     | 1.000     | 1.374     | −0.374     |
| 18p | 1.552     | 1.293     | 0.621     | 0.000     | 1.194     | −1.194     |
| 20s | 0.286     | 0.405     | 0.714     | 1.000     | 1.374     | −0.374     |
| 20c | 0.000     | 0.167     | 0.600     | 1.000     | 1.154     | −0.154     |
| 20r | −0.200    | 0.000     | 0.520     | 1.000     | 1.000     | 0.000      |
| 20p | −1.338    | −1.115    | −0.535    | 0.000     | −1.029    | 1.029      |

TABLE 2

|     | 1st-Speed | 2nd-Speed | 3rd-Speed | 4th-Speed | 5th-Speed | Rear Drive |
|-----|-----------|-----------|-----------|-----------|-----------|------------|
| 16s | −1.889    | −1.346    | 0.000     | 1.000     | 1.000     | 1.000      |
| 16c | 0.333     | 0.459     | 0.769     | 1.000     | 1.341     | −0.341     |
| 16r | 1.000     | 1.000     | 1.000     | 1.000     | 1.443     | −0.743     |
| 16p | 1.905     | 1.547     | 0.659     | 0.000     | 0.292     | −1.149     |
| 18s | −1.889    | −1.346    | 0.000     | 1.000     | 0.000     | 1.000      |
| 18c | −0.232    | 0.000     | 0.574     | 1.000     | 1.000     | 0.000      |
| 18r | 0.333     | 0.459     | 0.769     | 1.000     | 1.341     | −0.341     |
| 18p | 1.714     | 1.392     | 0.593     | 0.000     | 1.034     | −1.034     |
| 20s | 0.333     | 0.459     | 0.769     | 1.000     | 1.341     | −0.341     |
| 20c | 0.000     | 0.188     | 0.654     | 1.000     | 1.140     | −0.140     |
| 20r | −0.232    | 0.000     | 0.574     | 1.000     | 1.000     | 0.000      |
| 20p | −1.519    | −1.233    | −0.526    | 0.000     | −0.916    | 0.916      |

TABLE 3

|     | 1st-Speed | 2nd-Speed | 3rd-Speed | 4th-Speed | 5th-Speed | Rear Drive |
|-----|-----------|-----------|-----------|-----------|-----------|------------|
| 16s | −1.786    | −1.230    | 0.000     | 1.000     | 1.000     | 1.000      |
| 16c | 0.357     | 0.485     | 0.769     | 1.000     | 1.395     | −0.395     |
| 16r | 1.000     | 1.000     | 1.000     | 1.000     | 1.513     | −0.813     |
| 16p | 1.837     | 1.470     | 0.659     | 0.000     | 0.339     | −1.195     |
| 18s | −1.786    | −1.230    | 0.000     | 1.000     | 0.000     | 1.000      |
| 18c | −0.249    | 0.000     | 0.552     | 1.000     | 1.000     | 0.000      |
| 18r | 0.357     | 0.485     | 0.769     | 1.000     | 1.395     | −0.395     |
| 18p | 2.004     | 1.604     | 0.719     | 0.000     | 1.304     | −1.304     |
| 20s | 0.357     | 0.485     | 0.769     | 1.000     | 1.395     | −0.395     |
| 20c | 0.000     | 0.200     | 0.641     | 1.000     | 1.162     | −0.162     |
| 20r | −0.249    | 0.000     | 0.552     | 1.000     | 1.000     | 0.000      |
| 20p | −1.652    | −1.322    | −0.593    | 0.000     | −1.075    | 1.075      |

It will be understood from Tables 1, 2 and 3 that the speeds of the rotary members are relatively low, with the highest speed of the first planetary gear 16p being as low as 2.381 in the 1st-speed position in the case of Table 1, while the planetary gears 16p, 18p and 20p generally tend to have comparatively high speeds as compared with those of the other rotary elements.

It is noted that the 5th-speed position which is most frequently used during running of the vehicle is established by the activation of the second planetary gear unit 18 only, and therefore provides excellent power transmission efficiency.

Further, the speed reduction ratios $\rho_1$, $\rho_2$, $\rho_3$ of the present transmission 10 may be suitably selected within a range between about 0.3 and about 0.7. This allows the transmission 10 to be constructed with comparatively reduced dimensions.

The instant transmission 10 does not suffer from power circulation in any one of the operating positions, assuring a sufficiently high degree of power transmission efficiency.

It is also noted that the transmission 10 does not require a shaft which extends along the axis of the third sun gear 20s. In this respect, too, the overall size of the transmission 10 in the radial direction of the planetary gear units 16, 18. 20 can be reduced.

In the present embodiment, the transmission 10 is provided with the output gear 22 for operative connection with the front drive wheels of a front-drive vehicle. Since the output gear 22 is located at the output side extreme end of the transmission 10, the transmission may be readily modified for use on a rear-drive vehicle, with simple replacement of the output gear 22 by a suitable output shaft for operative connection with the rear drive wheels of the vehicle.

Figures 3, 4:
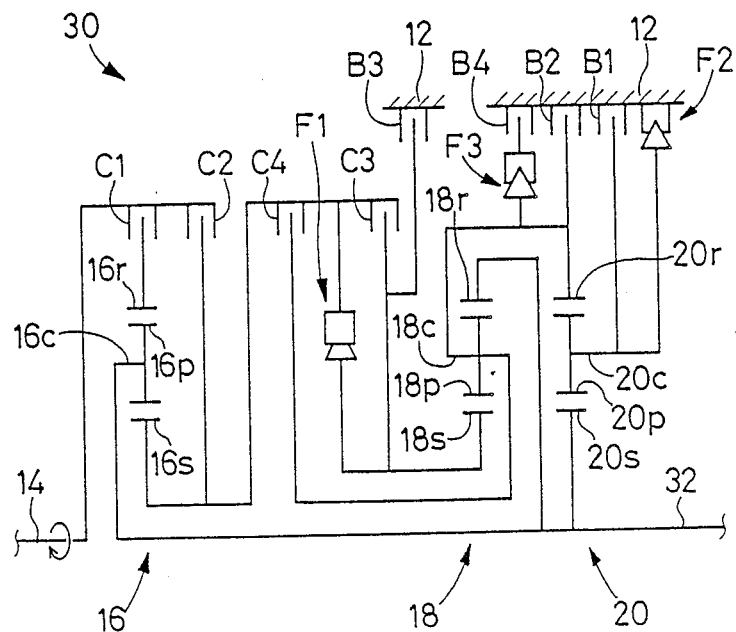
FIG. 3 is a schematic view corresponding to that of FIG. 1, illustrating another embodiment of the invention.
FIG. 4 is a view corresponding to that of FIG. 2, showing the relationship between the operating positions of the coupling devices and the transmission of FIG. 3.

Referring next to FIGS. 3 and 4, another embodiment of the present invention will be described, using the same reference numerals as used in FIGS. 1 and 2, to identify the functionally corresponding components.

In FIG. 3, reference numeral 30 generally designates a planetary gear transmission which is different from the transmission 10 of the preceding embodiment, in that the transmission 30 further includes a first one-way clutch F1, a second one-way clutch F2, a third one-way clutch F3, and a fourth brake B4, and uses an output shaft 32 in place of the output gear 22 used in the preceding embodiment. The first one-way clutch F1 is disposed between the first and second sun gears 16s, 18s, in parallel to the third clutch C3. This one-way clutch F1 is engaged when its outer race on the side of the first sun gear 16s is rotated at a higher speed than the inner race on the side of the second sun gear 18s, in the direction (reverse direction) opposite to the direction of rotation of the input shaft 14, or when the inner race is rotated at a higher speed than the outer race, in the same direction (forward direction) as the input shaft 14. The first one-way clutch F1 cooperates with the third clutch C3 to constitute the third frictional coupling device.

The second one-way clutch F2 is disposed between the third carrier 20c and the transmission casing 12, in parallel to the first brake B1. This one-way clutch F2 is engaged when its inner race on the side of the third carrier 20c and its outer race on the side of the casing 12 are rotated in the opposite directions. The second one-way clutch F2 cooperates with the first brake B1 to constitute the second frictional coupling device.

The third one-way clutch F3 and the fourth brake B4 are connected in series with each other, and are disposed between the transmission casing 12, and the second carrier 18c and the third ring gear 20r, in parallel to the second brake B2. The fourth brake B4 is a multiple-disk type or band type brake similar to the brakes B1, B2, B3, which is activated by a hydraulic actuator. The brake B4 is disposed between the third one-way clutch F3 and the transmission casing 12, and is engaged for fixing the outer race of the third one-way clutch F3 to the casing 12, when needed. The third one-way clutch F3 is engaged when its outer race on the side of the second carrier 18c and third ring gear 20r and its inner race are rotated in the opposite directions. The third one-way clutch F3 cooperates with the second and fourth brakes B2, B4 to constitute the sixth frictional coupling device.

The planetary gear transmission 30 constructed as described above has five forward drive positions and one rear drive position, which are selectively established by engagement of the appropriate ones of the first, second, third and fourth clutches C1–C4 and first, second, third and fourth brakes B1–B4, as indicated in the table of FIG. 4. In the table, a symbol "o" indicates the engaged frictional coupling devices (clutches or brakes) or one-way clutches, while a symbol " "

indicates the frictional coupling devices which are engaged only when an engine brake is applied to the vehicle, that is, only when the torque of the vehicle drive wheels is transmitted in the direction toward the vehicle engine (from the output shaft 32 toward the input shaft 14). A symbol "(o)" indicates the frictional coupling devices which are engaged for facilitating the relevant shifting or engaging actions of the transmission but do not contribute to the establishment or determination of the relevant operating positions of the transmission.

There will be described each of the six operating positions of the planetary gear transmission 30.

The 1st-speed position of the transmission 30 is established or selected by engagement of the first clutch C1, which results in connecting the first ring gear 16r and the input shaft 14. In the 1st-speed position, power received by the input shaft 14 is first imparted to the first ring gear 16r and then transmitted to the first carrier and sun gear 16c, 16s through the first planetary gear 16p. Consequently, the first carrier 16c is rotated in the forward direction, while the first sun gear 16s is rotated in the reverse direction. The power transmitted to the first sun gear 16s is transmitted to the second sun gear 18s through the first one-way clutch F1, whereby the second carrier 18c and the third ring gear 20r are rotated in the reverse direction while the second ring gear 18r is rotated in the forward direction. Although the rotation of the third ring gear 20r in the reverse direction is imparted to the third carrier 20c so as to rotate it in the reverse direction, the third carrier 20c is locked to the transmission casing 12 by the second one-way clutch F2, whereby the rotation of the third carrier 20c is prevented by the second one-way clutch F2. As a result, the output shaft 32 connected to the first carrier 16c, second ring gear 18r and third sun gear 20s is rotated in the forward direction, at the same speed reduction ratio as described with respect to the preceding embodiment.

In the 1st-speed position, the second carrier 18c and the third ring gear 20r are rotated in the reverse direction, but the third one-way clutch F3 is not engaged because the fourth brake B4 is in the non-engaged or disengaged position. The third one-way clutch F3 is rotated in the reverse direction, with the second carrier 18c and third ring gear 20r. When the torque is transmitted from the drive wheels to the transmission 30 in the direction from the output shaft 32 toward the input shaft 14, the one-way clutches F1 and F2 are brought to the disengaged position, and therefore an engine brake can be applied to the vehicle when desired, by activating the third clutch C3 and first brake B1 as well as the first clutch C1.

The 2nd-speed position of the transmission 30 is established by concurrent engagement of the first clutch C1 and fourth brake B4, which result in concurrent connections between the first ring gear 16r and the input shaft 24, and between the third one-way clutch F3 and transmission casing 12. In the 2nd-speed position, the rotations of the second carrier 18c and third ring gear 20r in the reverse direction are prevented by the engaged third one-way clutch F3, rather than the second one-way clutch F2 as in the 1st-speed position. Thus, the output shaft 32 is rotated in the forward direction, at the same speed reduction ratio as described with respect to the preceding embodiment.

In the 2nd-speed position, the third carrier 20c is rotated in the forward direction, and the second one-way clutch F2 remains in the disengaged position. When the torque is transmitted to the transmission 30 in the direction from the output shaft 32 toward the input shaft 14, the engaged one-way clutches F1 and F3 are disengaged, and an engine brake can be applied to the vehicle when needed, by activating the third clutch C3 and second brake B2, as well as the first clutch C1 and fourth brake B4, or in place of the fourth brake B4.

The 3rd-speed position of the transmission 30 is established by concurrent engagement of the fourth clutch C4 as well as the first clutch C1 and fourth brake B4, which result in concurrent connections between the first ring gear 16r and the input shaft 14, between the third one-way clutch F3 and transmission casing 12, and between the first sun gear 16s, and the second carrier 18c and third ring gear 20r. In the 3rd-speed position, the rotations of the first sun gear 16s as well as the rotations of the second carrier 18c and third ring gear 20r are prevented, and the output shaft 32 is rotated in the forward direction, at the same speed reduction ratio as described with respect to the preceding embodiment.

In the 3rd-speed position, the second sun gear 18s is rotated in the reverse direction while the first sun gear 16s is held stationary, whereby the first one-way clutch F1 is disengaged. However, the second one-way clutch F2 remains in the disengaged position as in the 2nd-speed position. When the torque is applied to the transmission 30 in the 3rd-speed position in the direction from the output shaft 32 toward the input shaft 14, the third one-way clutch F3 is disengaged, and an engine brake can be applied to the vehicle when desired, by activating the second brake B2, as well as the first and fourth clutches C1, C4 and fourth brake B4, or in place of the fourth brake B4.

The 4th-speed position is established by activating the second clutch C2 as well as the first and fourth clutches C1, C4 and the fourth brake B4. The engaging actions of these clutches and brake cause concurrent connections between the first ring gear 16r and the input shaft 14, between the first sun gear 16s and the second carrier 18c and third ring gear 20r, between the third one-way clutch F3 and the transmission casing 12, and between the first sun gear 16s and the input shaft 14. In this 4th-speed position, the elements of the first, second and third planetary gear units 16, 18 and 20 are rotated as a unit, whereby the output shaft 32 is rotated in the forward direction, at the speed reduction ratio of 1.0.

In the 4th-speed position, the first one-way clutch F1 is engaged since the first and second sun gears 16s, 18s are rotated together. However, the first one-way clutch F1 does not contribute to the establishment of the 4th-speed position. Further, since the second carrier 18c, third ring gear 20r and third carrier 20c are rotated in the forward direction, the second and third one-way clutches F2 and F3 remain in the disengaged position. Accordingly, the fourth brake B4 which connects the outer race of the third one-way clutch F3 and the transmission casing 12 does not contribute to the establishment of the 4th-speed position, and the fourth brake B4 may be placed in the disengaged or deactivated position. However, the engagement of the fourth brake B4 facilitates the shifting of the transmission 30 between the 3rd-speed and 4th-speed positions. The engagement of the fourth clutch C4 does not contribute to the establishment of the 4th-speed position, either, but is desirable for facilitating the shifting operations between the 3rd-speed and 4th-speed positions, between the 4th-speed and 5th-speed positions, or for avoiding or restricting the rotation of the gears that is not necessary for transmitting power.

The 5th-speed position is established by activating the second and fourth clutches C2 and C4 and fourth brake B4, and activating the third brake B3 in place of the first clutch C1 activated for the 4th-speed position. The engagement of these coupling devices C2, C4, B3, B4 causes concurrent connections between the first sun gear 16s and the input shaft 14, between the first sun gear 16s, and the second carrier 18c and third ring gear 20r, between the second sun gear 18s and the transmission casing 12, and between the third one-way clutch F3 and the transmission casing 12. In this 5th-speed position, the power received by the input shaft 14 is imparted to the second ring gear 18r via the fourth clutch C4 and the second carrier and planetary gears 18c, 18p, as in the preceding embodiment. As a result, the output shaft 32 connected to the second ring gear 18r is rotated in the forward direction, at the same speed reduction ratio as in the preceding embodiment, which is smaller than 1.

In the 5th-speed position, all the relevant rotary members except for the second sun gear 18s are rotated in the forward direction, with the second sun gear held at rest. Accordingly, the one-way clutches F1, F2 and F3 are all held in their non-engaged or disengaged position. Therefore, the activation of the fourth brake B4 is not essential, but is desirable for easy control for shifting the transmission to the 5th-speed position.

The rear drive position of the transmission 30 is established by concurrent engagement of the second and third clutches C2, C3 and the first brake B1, which result in concurrent connections between the first sun gear 16s and the input shaft 14, between the first and second sun gears 16s, 18s, and between the third carrier 20c and the transmission casing 12. In this rear drive position, a part of the power received by the input shaft 14 is imparted to the second ring gear 18r and output shaft 32 through the second sun and planetary gears 18s, 18p, and the other part of the power is imparted to the third sun gear 20s and output shaft 32 through the second carrier 18c and third ring and planetary gears 20r, 20p. Since the third carrier 20c is stationary in this condition, the output shaft 32 is rotated in the reverse direction, at the speed reduction ratio of $(1+\rho_3+\rho_2\rho_3)/\rho_2$.

In the rear drive position, the first and second sun gears 16s, 18s are connected together by the third clutch C3, while the third carrier 20c is fixed to the transmission casing 12 by the engaged first brake B1. Consequently, the one-way clutches F1 and F2 remain disengaged. Further, the third one-way clutch F3 also remains disengaged since the second carrier 18c and third ring gear 20r are rotated in the forward direction.

It will be understood from the above description that the planetary gear transmission 30 according to the present embodiment has the same advantages as the transmission 10 of the preceding embodiment. In addition, the present transmission 30 permits shifting from one of the 1st-speed, 2nd-speed, 3rd-speed and 4th-speed positions to the adjacent position, by activating only one clutch or brake. This arrangement assures increased ease of control for shifting the transmission, and a reduced shifting shock.

It will be understood that the output shaft 32 may be replaced by an output gear as indicated at 22 in FIG. 1.

Figures 5, 6:
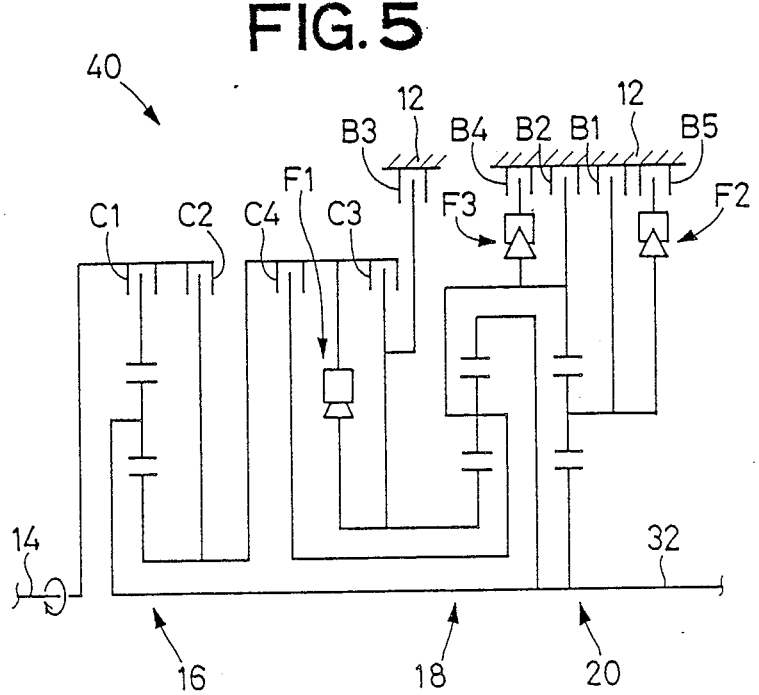
FIG. 5 is a schematic view corresponding to that of FIG. 1, illustrating a further embodiment of the invention.
FIG. 6 is a view corresponding to that of FIG. 2, showing relationship between the operating positions of the coupling devices and the transmission of FIG. 5.

Referring next to FIGS. 5 and 6, a further embodiment of the planetary gear transmission is shown generally at 40. This transmission 40 is a modified form of the preceding embodiment of FIGS. 3 and 4, and includes a fifth brake B5 disposed between the second one-way clutch F2 and the transmission casing 12. The fifth brake B5 is a multiple-disk type or band type brake operated by a hydraulic actuator. The fifth brake B5 cooperates with the second one-way clutch F2 and first brake B1 to constitute the fifth frictional coupling device. The transmission 40 has five forward drive positions and one rear drive position, which are selectively established by activating the appropriate ones of the clutches C1–C4 and brakes B1–B5, as indicated in the table of FIG. 6.

As indicated in FIG. 6, the added fifth brake B5 is engaged in all of the five forward drive positions, for easy shifting of the transmission, more precisely, for easy shifting to one of the 2nd-speed, 3rd-speed, 4th-speed and 5th-speed positions, as described with respect to the brake B4 in the preceding embodiment of FIGS. 3 and 4.

In the transmission 40, the rear drive position is established by engagement of the second and third clutches C2, C3 and the second brake B2, and provides the same speed reduction ratio as in the transmission 10 of the first embodiment of FIGS. 1 and 2. In the rear drive position, the third carrier 20c is rotated in the reverse direction, but the second one-way clutch F2 remains disengaged since the fifth brake B5 is in the disengaged position. Accordingly, the second one-way clutch F2 is rotated in the reverse direction with the third carrier 20c.

Figures 7, 8:
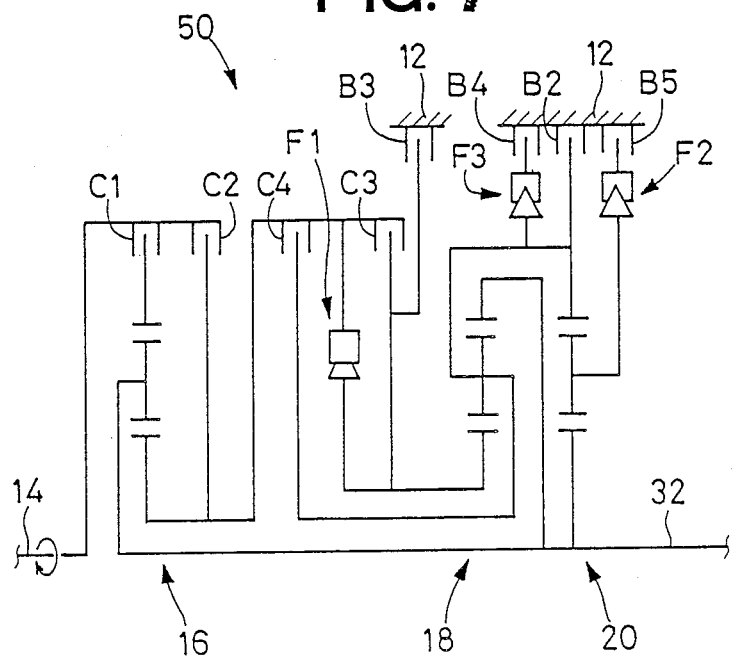
FIG. 7 is a schematic view corresponding to that of FIG. 1, illustrating a still further embodiment of the invention.
FIG. 8 is a view corresponding to that of FIG. 2, showing the relationship between the operating positions of the coupling devices and the transmission of FIG. 7.

Reference is now made to FIGS. 7 and 8, which show a planetary gear transmission constructed according to a still further embodiment of the present invention. This transmission, generally indicated at 50 in FIG. 8, is obtained by removing the first brake B1 from the transmission 40 of FIGS. 5 and 6. Namely, the fifth frictional coupling device is constituted by only the second one-way clutch F2 and the fifth brake B5. In the present transmission 50, the five forward drive positions and one rear drive position are selectively established by activating the appropriate ones of the clutches C1–C4 and brakes B2–B5, as indicated in the table of FIG. 8. The transmission 50 has the same advantages as the transmissions 30 and 40 discussed above, except that the transmission 50 which does not have the first brake B1 is not capable of permitting an engine brake to be applied to the vehicle when the transmission 50 is placed in the 1st-speed position.

While the present invention has been described in its presently preferred embodiments with a certain degree of particularities, it is to be understood that the invention is not limited to the details to the illustrated embodiments, but may be otherwise embodied.

For example, the torque converter 24 provided in the illustrated embodiments may be provided with a lock-up clutch, or replaced by a fluid coupling, an electromagnetic clutch using a magnetizable powder or a multiple-disk or single-disk type friction clutch.

Further, a single actuator may be used to operate two or more of the clutches and brakes used in the transmission. For instance, a hydraulically operated piston may be used to selectively activate the first and second clutches C1, C2 such that the first clutch C1 is engaged by a movement of the piston in one direction while the second clutch C2 is engaged by a movement of the piston in the opposite direction.

While the planetary transmissions 30, 40 and 50 of the second, third and fourth embodiments use the three one-way clutches F1–F3 which constitute part of the relevant frictional coupling devices indicated above, the location of these one-way clutches may be suitably modified, or these one-way clutches may be used for the frictional coupling devices other than those indicated above.

Although the output gear 22 of the first embodiment is disposed on one side of the transmission 10 remote from the engine 26 and torque converter 24, the output gear 22 may be located on the other side adjacent to the engine and torque converter, by modifying the transmission 10 such that the input shaft 14 extends through the transmission 10, coaxially with the planetary gear units 16, 18, 20. Similar modification of the other embodiments is possible, if the output shaft 32 is replaced by an output gear.

It will also be understood that the illustrated transmissions 10, 30, 40, 50 may be modified as needed, in various aspects, such as the gear ratio of each planetary gear unit, speed reduction ratio of each operating position of the transmissions, location of the clutches and brakes, and frictional coupling devices assigned to establish the operating positions.

It is to be understood that the present invention may be embodied with various other changes, modifications and improvements, which may occur to those skilled in the art, without departing from the spirit and scope of the invention defined in the following claims.

What is claimed is:

1. A planetary gear transmission for a motor vehicle, including an input member, an output member, a stationary member, a first single-pinion type planetary gear unit having a first sun gear, a first planetary gear, a first carrier rotatably supporting the first planetary gear, and a first ring gear, a second single-pinion type planetary gear unit having a second sun gear, a second planetary gear, a second carrier rotatably supporting the second planetary gear, and a second ring gear, and a third single-pinion type planetary gear unit having a third sun gear, a third planetary gear, a third carrier rotatably supporting the third planetary gear, and a third ring gear, said first, second and third planetary gear units being disposed coaxially with each other in the order of description, for transmitting power from said input member to said output member, at a selected one of different speed reduction ratios, wherein the improvement comprises:

said first carrier, said second ring gear, said third sun gear and said output member being connected to each other for rotation as a unit during operation of the transmission, while said second carrier and said third ring gear are connected to each other for rotation as a unit during operation of the transmission;

a first coupling device for connecting said first ring gear to said input member;

a second coupling device for connecting said first sun gear to said input member;

a third coupling device for connecting said first sun gear to said second sun gear;

a fourth coupling device for connecting said first sun gear to said second carrier and said third ring gear;

a fifth coupling device for fixing said third carrier to said stationary member;

a sixth coupling device for fixing said second carrier and said third ring gear to said stationary member; and a seventh coupling device for fixing said second sun gear to said stationary member.

2. A planetary gear transmission according to claim 1, wherein said first, second, third, fourth, fifth, sixth and seventh coupling devices cooperate with each other to selectively establish five forward drive positions and one rear drive position, said five forward drive positions consisting of a 1st-speed position having a highest first speed reduction ratio, a 2nd-speed position having a second speed reduction ratio lower than said first speed reduction ratio, a 3rd-speed position having a third speed reduction ratio lower than said second speed reduction ratio, a 4th-speed position having a fourth speed reduction ratio lower than said third speed reduction ratio, and a 5th-speed position having a fifth speed reduction ratio lower than said fourth speed reduction ratio.

3. A planetary gear transmission according to claim 2, wherein said first, third and fifth coupling devices are engaged so as to effect concurrent connections between said first ring gear and said input member, between said first and second sun gears, and between said third carrier and said stationary member, respectively, when the transmission is placed in said 1st-speed position.

4. A planetary gear transmission according to claim 3, characterized in that said first, third and sixth coupling devices are engaged so as to effect concurrent connections between said first ring gear and said input member, between said first and second sun gears, and between said second carrier, third ring gear and said stationary member, when the transmission is placed in said 2nd-speed position.

5. A planetary gear transmission according to claim 4, wherein said first, third and seventh coupling devices are engaged so as to effect concurrent connections between said first ring gear and said input member, between said first and second sun gears, and between said second sun gear and said stationary member, respectively, when the transmission is placed in said 3rd-speed position.

6. A planetary gear transmission according to claim 4, wherein said first, fourth and sixth coupling devices are engaged so as to effect concurrent connections between said first ring gear and said input member, between said first sun gear, said second carrier and third ring gear, and between said second carrier and said stationary member, respectively, when the transmission is placed in said 3rd-speed position.

7. A planetary gear transmission according to claim 5, wherein said first, second and third coupling devices are engaged so as to effect concurrent connections between said first ring gear and said input member, between said first sun gear and said input member, and between said first and second sun gears, respectively, when the transmission is placed in said 4th-speed position.

8. A planetary gear transmission according to claim 6, wherein said first, second and fourth coupling devices are engaged so as to effect concurrent connections between said first ring gear and said input member, between said first sun gear and said input member, and between said first sun gear, said second carrier and third ring gear, respectively, when the transmission is placed in said 4th-speed position.

9. A planetary gear transmission according to claim 7, characterized in that said second, fourth and seventh coupling devices are engaged so as to effect concurrent connections between said first sun gear and said input member, between said first sun gear, said second carrier, and said third ring gear, and between said second sun gear and said stationary member, respectively, when the transmission is placed in said 5th-speed position.

10. A planetary gear transmission according to claim 9, wherein said second, third and sixth coupling devices are engaged so as to effect concurrent connections between said first sun gear and said input member, between said first and second sun gears, and between said second carrier, third ring gear, and said stationary member, when the transmission is placed in said rear drive position.

11. A planetary gear transmission according to claim 8, wherein said second, third and fifth coupling devices are engaged so as to effect concurrent connections between said first sun gear and said input member, between said first and second sun gears, and between said third carrier and said stationary member, respectively, when the transmission is placed in said rear drive position.

* * * * *